US012328243B1

(12) United States Patent
DeRego et al.

(10) Patent No.: US 12,328,243 B1
(45) Date of Patent: Jun. 10, 2025

(54) RADIO ACCESS NETWORK EVENT TRACING SYSTEM

(71) Applicant: Amazon Technologies, Inc., Seattle, WA (US)

(72) Inventors: Theodore Joseph Maka'iwi DeRego, Shoreline, WA (US); Nikolay Krasilnikov, Seattle, WA (US); Benjamin Wojtowicz, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 359 days.

(21) Appl. No.: 17/810,260

(22) Filed: Jun. 30, 2022

(51) Int. Cl.
*H04L 43/04* (2022.01)
*G06F 16/9538* (2019.01)
*H04L 43/045* (2022.01)
*H04L 43/10* (2022.01)
*H04W 24/08* (2009.01)
*G06F 3/04842* (2022.01)

(52) U.S. Cl.
CPC ........ *H04L 43/045* (2013.01); *G06F 16/9538* (2019.01); *H04L 43/10* (2013.01); *H04W 24/08* (2013.01); *G06F 3/04842* (2013.01)

(58) Field of Classification Search
CPC ... H04L 43/045; H04L 43/10; G06F 16/9538; G06F 3/04842; H04W 24/08
See application file for complete search history.

(56) References Cited

U.S. PATENT DOCUMENTS

| | | | | |
|---|---|---|---|---|
| 2003/0100299 | A1* | 5/2003 | Ko | H04L 43/02 455/423 |
| 2006/0258339 | A1* | 11/2006 | Connelly | H04M 15/41 455/414.1 |
| 2009/0252040 | A1* | 10/2009 | Kocaturk | H04W 28/06 370/310 |
| 2012/0307760 | A1* | 12/2012 | Han | H04W 72/0466 370/329 |
| 2016/0086571 | A1* | 3/2016 | Aoki | G06F 3/04847 345/593 |
| 2018/0367283 | A1* | 12/2018 | Huang | H04L 1/1812 |
| 2023/0087665 | A1* | 3/2023 | Prakash | H04W 88/00 370/235 |

* cited by examiner

*Primary Examiner* — Steven Hieu D Nguyen
(74) *Attorney, Agent, or Firm* — Knobbe Martens Olson & Bear LLP (57) ABSTRACT

Systems and methods are described for implementing an event tracing system for an open radio access network ("RAN"). A RAN implementation may be distributed across multiple components, including both special-purpose components such as radio units and general purpose components such as local or cloud-based servers. A RAN event tracing system may thus be used to troubleshoot issues with the RAN implementation by collecting information from distributed components regarding events that occur on these components during the translation of data into radio signals and vice versa. The RAN event tracing system may be used to search for events associated with a particular identifier, such as a radio network temporary identifier, and to display representations of radio frames that were generated by the components and display information regarding the events that led to the placement of particular resource elements onto the radio frames.

20 Claims, 7 Drawing Sheets

RADIO ACCESS NETWORK EVENT TRACING SYSTEM

BACKGROUND

Generally described, computing devices can be used to exchange information via a network. Computing devices may utilize a wireless network provided by a service provider to facilitate the exchange of information in accordance with one or more wireless communication protocols. For example, a service provider may maintain a wireless network that enables mobile computing devices to exchange information in accordance with a fifth-generation wireless telecommunications protocol, such as the "5G" protocol. The wireless network may be comprised of individual network components, such as radio units that transmit and receive radio signals within a particular geographic area and edge routers that connect to other communications networks. Radio units may thus receive data from edge routers and transmit the data to user devices, and vice versa.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Generally described, aspects of the present disclosure relate to wireless telecommunications. More specifically, aspects of the present disclosure are directed to systems, methods, and computer-readable media related to a radio access network ("RAN") event tracing system. A 5G RAN may be implemented across multiple discrete components, such as radio units ("RUs"), distributed units ("DUs"), centralized units ("CUs"), and the like. RUs may generally implement "layer 1" (which may be referred to herein as "L1") or "physical layer" functions related to the transmission and receipt of radio signals, such as converting encoded digital signals into radio waves and vice versa, transmitting and receiving the radio waves during specified timing windows and on specified frequencies, and so forth. An RU may be located in close proximity to amplifiers, filters, towers, antennas, and other hardware that are used to transmit and receive radio signals, and each RU may provide coverage to a different geographic area, which may partially overlap the areas of neighboring RUs in order to facilitate handoffs and provide seamless communication. DUs may generally receive data from CUs for delivery to RUs (and vice versa), and may process the data to encode or decode it, modulate or demodulate it, add or remove error correction or redundancy, or otherwise prepare data received from the CU for transmission over the air by the RU and vice versa. The functionality implemented by the DU may include some layer 1 functions, such as encoding the digital signals to be transmitted by the RU, adding redundancy and error correction codes to the digital signals, mapping transport channels to physical channels, and so forth. In some embodiments, the DU may include specialized hardware for performing layer 1 functions, such as an accelerator card that performs signal processing functions. The DU may also implement some "layer 2" (which may be referred to herein as "L2") functions, such as mapping logical channels to transport channels, determining the timing of the RU's digital signal transmissions within a timing window, and so forth. The CU, in turn, may implement "layer 3" functions such as mediating access to external networks, authorizing access to the RAN, and so forth.

In some embodiments, certain components of a RAN may be implemented using a cloud provider network. A cloud provider network (sometimes referred to simply as a "cloud") refers to a pool of network-accessible computing resources (such as compute, storage, and networking resources, applications, and services), which may be virtualized or provided as "bare metal" hardware. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet) and the hardware and software in cloud provider data centers that provide those services. Other components of a RAN may require or benefit from the usage of specialized hardware, such as radio transceivers or dedicated signal processors.

A RAN may thus be implemented across multiple components, some of which may be cloud-based. The RAN may provide sophisticated wireless telecommunications services to mobile computing devices, which may require complex interactions between the components of the RAN to implement various wireless protocols and features. If an error or failure occurs during these interactions, isolating the problem may be difficult due to the number of components involved and the complexity of the interactions. Isolating the problem may also be difficult due to the large number of interactions that occur as the open RAN continually distributes data to and from multiple mobile computing devices.

To address these issues, an operator of a RAN may implement a RAN event tracing system as described herein. As discussed in more detail below, the RAN event tracing system may be used to troubleshoot issues with the RAN implementation by collecting information from distributed components regarding events that occur on these components during the translation of data into radio signals and vice versa. The RAN event tracing system may then be used to search for events associated with a particular identifier (e.g., a radio network temporary identifier, or "RNTI"), and to display representations of radio frames that were generated by the components and display information regarding the events that led to the placement of particular resource elements onto the radio frames. The RAN event tracing system may thus be used to improve the performance of a RAN by enabling faster and more efficient identification of issues.

It will be understood that the techniques described herein address technical problems that specifically arise in the realm of computer networks, and in particular addresses a problem that arises in the realm of RANs when the functions of the RAN are distributed across several components. It will further be understood that the technical problem described herein is not analogous to any pre-Internet practice, and that the distributed unit described herein improves the performance of a radio access network by enabling faster and more efficient isolation of problems. A wireless network operator may thus use the techniques described herein to make more effective use of their radio access network and provide wireless telecommunications services more efficiently.

While the present disclosure refers to wireless standards such as 5G, it will be understood that the present disclosure is not limited to any particular wireless standard, and that embodiments of the present disclosure include other wireless standards and protocols that have similar characteristics with regard to timing (for example 4G, LTE, 6G, and the like). Similarly, although the present disclosure refers to particular components of a RAN, it will be understood that the present disclosure is not limited to these components and includes within its scope other components that may generate events while processing data sent via a RAN.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Figure 1:
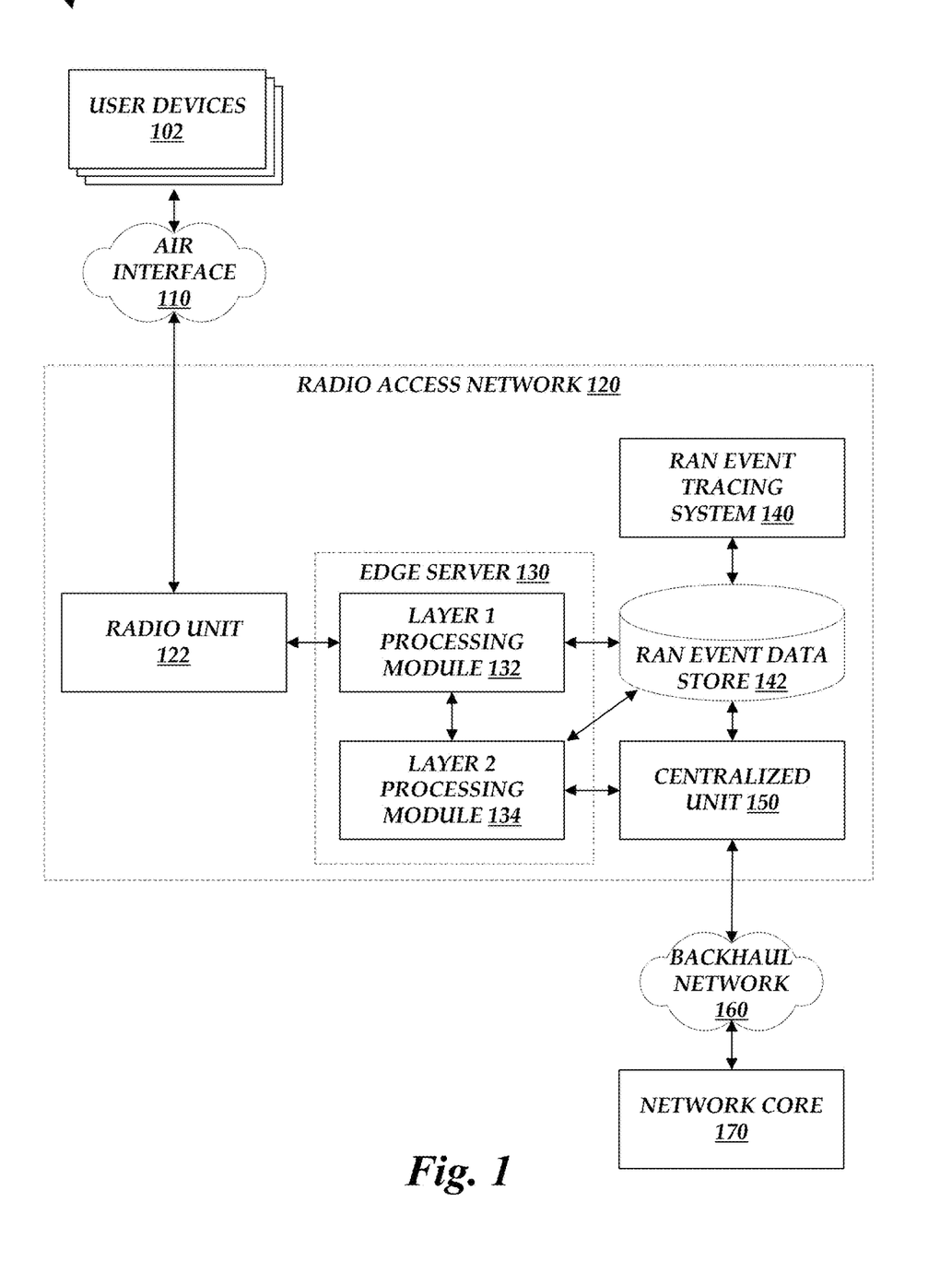
FIG. 1 is a block diagram depicting an example operating environment in which a radio access network may send and receive data, and a radio access network event tracing system may trace events associated with sending and receiving the data, in accordance with aspects of the present disclosure.

FIG. 1 is a block diagram of an example operating environment 100 in which a RAN event tracing system 140 may operate on events generated by components of a radio access network 120. As illustrated, the example operating environment 100 includes a number of user devices 102, which communicate via an air interface 110 to one or more radio access networks 120 via respective radio units 122. In general, the user devices 102 can be any device that is operable to communicate via the air interface 110. Examples of user devices 102 include mobile phones, tablet computing devices, laptop computing devices, wearable computing devices, desktop computing devices, personal digital assistants (PDAs), hybrid PDAs/mobile phones, electronic book readers, set-top boxes, voice command devices, cameras, digital media players, servers, and the like. The air interface 110 may illustratively be any interface to a wireless network, including but not limited to a cellular telecommunications network, Wi-Fi network, mesh network, personal area network, or any combination thereof. In some embodiments, the air interface 110 may be an interface to a Global System for Mobile Communications (GSM) network, Code Division Multiple Access (CDMA) network, Long Term Evolution (LTE) network, 5G network, or combinations thereof.

The radio unit 122 may generally be any component of a radio access network 120 that can be programmed to transmit and receive on different radio frequencies. The radio unit 122 may, in some embodiments, be connected to antennas or other equipment to enable transmission, amplification, receipt, or processing of radio signals. In some embodiments, the radio unit 122 may correspond to a base station of a cellular telephone network. The radio unit 122 may further be connected to an edge server 130, which enables communication with a centralized unit 150. In some embodiments, the edge server 130 may perform some or all of the functions of a distributed unit and/or centralized unit in an open radio access network ("open RAN") architecture. Additionally, in various embodiments, the radio unit 122, edge server 130, and/or centralized unit 150 may communicate with each other directly or via a network (not shown in FIG. 1).

The edge server 130 may implement all or part of the functionality of a DU in the RAN 120, and as such is generally responsible for the physical layer and at least some aspects of the data link layer of the radio access network 120. The edge server 130 receives data from the centralized unit 150 and transmits the data to the radio units 122 for delivery to the user devices 102, and vice versa. In the illustrated embodiment, the edge server 130 includes a layer 1 processing module 132, which may implement physical layer functions such as modulating and demodulating frequency domain signals, inserting and removing error correction codes, mapping frequency domain signals to radio frames, and the like. In some embodiments, as described above, the layer 1 processing module 132 may be implemented using specialized hardware such as an accelerator card that performs signal processing functions. The edge server 130 may further includes a layer 2 processing module 134, which may implement data link layer functions such as determining a mapping of signals to radio frames, multiplexing and demultiplexing of data delivered to/from layer 1, prioritizing and scheduling, mapping between logical channels and transport channels, beamforming, and the like. In some embodiments, the layer 1 processing module 132 and/or the layer 2 processing module 134 may be fully or partially implemented as a specialized hardware component of the edge server 130, such as a dedicated signal processor, that implements accelerated layer 1 functionality.

The RAN event tracing system 140 is described in more detail below with reference to FIG. 6, and may implement aspects of the present disclosure such as processing events generated by the components of the radio access network 120, providing user interfaces for querying and displaying such events, and the like. In some embodiments, the RAN event tracing system 140 may communicate directly (or indirectly via a network not depicted in FIG. 1) with components of the radio access network 120 other than the RAN event data store 142.

The centralized unit 150 is responsible for the network layer functions of the radio access network 120, and provides communication with other computing devices via a backhaul network 160 and network core 170. In some embodiments, the centralized unit 150 and/or other components of the radio access network 120 may be cloud-based. The backhaul network 160 may illustratively be any wired or wireless network or combination thereof. In addition, the backhaul network 160 may include, but is not limited to, the Internet, public or private intranets, cellular telecommunications networks, Wi-Fi networks, cable networks, satellite networks, mesh networks, personal area networks, local area networks (LANs), wide area networks (WANs), or other public or private communications network or networks, or any combination thereof. The network core 170, as described in more detail below, may implement control plane functions for managing the RAN 120 and other components of a wireless telecommunications network.

The layer 1 processing module 132, layer 2 processing module 134, RAN event tracing system 140, and in some embodiments the centralized unit 150 (and, in embodiments not depicted in FIG. 1, the radio unit 122) may communicate with a RAN event data store 142, The RAN event data store 142 may generally be any non-transitory computer-readable storage medium that implements aspects of the present disclosure, including but not limited to a magnetic medium (e.g., a hard disk drive), optical medium, solid state device, flash drive, and the like. In some embodiments, the RAN event data store 142 may be implemented as a database, database server, or other server. In various embodiments, the RAN event data store 142 may be implemented as a single data store or multiple data stores.

The radio unit 122, edge server 130, and centralized unit 150 are collectively referred to as an "open" radio access network 120, and split the functions of a monolithic baseband unit into modular components that provide distinct functionality and can be sourced from multiple vendors. In some embodiments, all or part of the radio access network 120 may be implemented using a cloud provider network. A cloud provider network (sometimes referred to simply as a "cloud") refers to a pool of network-accessible computing resources (such as compute, storage, and networking resources, applications, and services), which may be virtualized or provided as "bare metal" hardware. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network can provide on-demand, scalable computing platforms to users through a network, for example allowing users to have at their disposal scalable "virtual computing devices", also referred to as virtual computing instances, via their use of the compute servers (which provide compute instances via the usage of one or both of CPUs and GPUs, optionally with local storage) and block store servers (which provide virtualized persistent block storage for designated compute instances). These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. An application programming interface (API) refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. Users can choose to deploy their virtual computing systems to provide network-based services for their own use and/or for use by their customers or clients.

A cloud provider network can be formed as a number of regions, where a region is a separate geographical area in which the cloud provider clusters data centers. Each region can include two or more availability zones connected to one another via a private high speed network, for example a fiber communication connection. An availability zone refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network). Transit Centers (TC) are the primary backbone locations linking customers to the cloud provider network, and may be co-located at other network provider facilities (e.g., Internet service providers, telecommunications providers). Each region can operate two TCs for redundancy.

The cloud provider network can include a physical network (e.g., sheet metal boxes, cables, rack hardware) referred to as the substrate. The substrate can be considered as a network fabric containing the physical hardware that runs the services of the provider network. The substrate may be isolated from the rest of the cloud provider network, for example it may not be possible to route from a substrate network address to an address in a production network that runs services of the cloud provider, or to a customer network that hosts customer resources.

The cloud provider network can also include an overlay network of virtualized computing resources that run on the substrate. As such, network packets can be routed along a substrate network according to constructs in the overlay network (e.g., VPCs, security groups). A mapping service can coordinate the routing of these network packets. The mapping service can be a regional distributed look up service that maps the combination of overlay IP and network identifier to substrate IP so that the distributed substrate computing devices can look up where to send packets.

To illustrate, each physical host (e.g., a compute server, a block store server, an object store server, a control server) can have an IP address in the substrate network. Hardware virtualization technology can enable multiple operating systems to run concurrently on a host computer, for example as virtual machines (VMs) on a compute server. A hypervisor, or virtual machine monitor (VMM), on a host allocates the host's hardware resources amongst various VMs on the host and monitors the execution of VMs. Each VM may be provided with one or more IP addresses in the overlay network, and the VMM on a host may be aware of the IP addresses of the VMs on the host. The VMMs (and/or other devices or processes on the network substrate) may use encapsulation protocol technology to encapsulate and route network packets (e.g., client IP packets) over the network substrate between virtualized resources on different hosts within the cloud provider network. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (public IP addresses) to substrate IP addresses (private IP addresses), which can be accessed by various processes on the cloud provider network for routing packets between endpoints.

The traffic and operations of the provider network substrate may broadly be subdivided into two categories in various embodiments: control plane traffic carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as establishing isolated virtual networks for various customers, monitoring resource usage and health, identifying a particular host or server at which a requested compute instance is to be launched, provisioning additional hardware as needed, and so on. The data plane includes customer resources that are implemented on the provider network (e.g., computing instances, containers, block storage volumes, databases, file storage). Data plane traffic generally includes non-administrative operations such as transferring data to and from the customer resources.

The data plane can include one or more compute servers, which may be bare metal (e.g., single tenant) or may be virtualized by a hypervisor to run multiple VMs (sometimes referred to as "instances") for one or more customers. These compute servers can support a virtualized computing service of the provider network. The provider may offer virtual compute instances with varying computational and/or memory resources. In one embodiment, each of the virtual compute instances may correspond to one of several instance types. An instance type may be characterized by its hardware type, computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

The control plane components are typically implemented on a separate set of servers from the data plane servers, and control plane traffic and data plane traffic may be sent over separate/distinct networks. In some embodiments, control plane traffic and data plane traffic can be supported by different protocols. In some embodiments, messages (e.g., packets) sent over the provider network include a flag to indicate whether the traffic is control plane traffic or data plane traffic. In some embodiments, the payload of traffic may be inspected to determine its type (e.g., whether control or data plane). Other techniques for distinguishing traffic types are possible.

Some customers may desire to use the resources and services of the cloud provider network, but for various reasons (e.g., latency in communications with customer devices, legal compliance, security, or other reasons) prefer for these resources and services to be provisioned within their own network, for example on premises of the customer. The technology described herein enables a piece of the cloud provider network-referred to herein as a "provider substrate extension" or PSE-to be provisioned within the customer's network. A customer may access their PSE via the cloud provider substrate or their own network, and may use the same APIs to create and manage resources in the PSE as they would use to create and manage resources in the region.

The PSE may be pre-configured, e.g. by the provider network operator, with the appropriate combination of hardware with software and/or firmware elements to support various types of computing-related resources, and to do so in a manner that mirrors the experience of using the provider network. For example, one or more PSE servers can be provisioned by the cloud provider within the customer network. As described above, the provider network may offer a set of predefined instance types, each having varying types and quantities of underlying hardware resources. Each instance type may also be offered in various sizes. In order to enable customers to continue using the same instance types and sizes in their PSE as they do in the region, the PSE server can be a heterogeneous server. A heterogeneous server can concurrently support multiple instance sizes of the same type, and may be also reconfigured to host whatever instance types are supported by its underlying hardware resources. The reconfiguration of the heterogeneous server can occur on-the-fly using the available capacity of the PSE server, meaning while other VMs are still running and consuming other capacity of the PSE server. This can improve utilization of resources within the PSE by allowing for better packing of running instances on physical hosts, and also provides a seamless experience regarding instance usage across the region and PSE.

In one embodiment, PSE servers can host one or more VMs. The customer can use these VMs to host containers, which package up code and all its dependencies so an application can run quickly and reliably from one computing environment to another. In addition, the PSE servers may host one or more data volumes, if desired by the customer. In the region, such volumes may be hosted on dedicated block store servers. However, due to the possibility of having a significantly smaller capacity in the PSE than in the region, it may not provide an optimal utilization experience if the PSE includes such dedicated block store servers. Accordingly, the block storage service may be virtualized in the PSE, such that one of the VMs runs the block store software and stores the data of the volume. Similar to the operation of the block storage service in the region, the volumes within a PSE may be replicated for durability and availability. The volumes may be provisioned within their own VPC within the PSE. The VMs and any volumes collectively make up an extension of the provider network data plane within the PSE.

The PSE servers may, in some implementations, host certain local control plane components, for example components that enable the PSE to continue functioning if there is a break in the connection back to the region. Examples of these components include a migration manager that can move VMs between PSE servers if needed to maintain availability, a key value data store that indicates where volume replicas are located, and a local VM placement component that can respond to requests for new VMs made via the customer network. However, generally the control plane for the PSE will remain in the region, in order to allow the customer to use as much capacity of the PSE as possible. At least some VMs that are set up at the PSE, and associated higher-level services that use such VMs as building blocks, may continue to function even during periods of time when connectivity to the provider network data centers is temporarily disrupted in some embodiments.

In the manner described above, the PSE forms an edge location, in that it provides the resources and services of the cloud provider network outside of a traditional cloud provider data center and closer to customer devices. An edge location, as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as local zones (due to being more local or proximate to a group of users than traditional availability zones). A local zone may be connected in various ways to a parent region, for example via a publicly accessible network such as the Internet, directly, via another network, or via a private connection to a region. Although typically a local zone would have more limited capacity than a region, in some cases a local zone may have substantial capacity, for example thousands of racks or more.

Accordingly, in some embodiments, all or part of the radio access network 120 (including, but not limited to, the edge server 130) may be implemented on edge location hardware that may for example be physically closer to devices such as the radio unit 122 and user devices 102. In some embodiments, an edge location may be a provider substrate extension formed by one or more servers located on-premises at a customer or partner facility. The server(s) may communicate over a network (e.g., a publicly-accessible network such as the Internet) with a nearby availability zone or region of the cloud provider network. This type of provider substrate extension may be referred to as an "outpost" of the cloud provider network. Some outposts may be integrated into communications networks. For example, an outpost may be integrated into a base station within a telecommunications network or co-located with the radio unit 122 or another RU of the network. The limited capacity of an on-premises outpost may be available for use only by the customer who owns the premises (and any other accounts allowed by the customer). Similarly, the limited capacity of an outpost integrated into a telecommunications network may be shared among a number of applications (e.g., games, virtual reality applications, healthcare applications) that send data to users of the telecommunications network. An outpost integrated into a telecommunications network may also include data plane capacity, which may be controlled at least partly by a control plane implemented in a nearby availability zone of the cloud provider network. As such, an availability zone group can include a "parent" availability zone and any "child" edge locations homed to (e.g., controlled at least partly by the control plane of) the parent availability zone. Certain limited control plane functionality (e.g., features that require low latency communication with customer resources, and/or features that enable the edge location to continue functioning when disconnected from the parent availability zone) may also be present in some edge locations.

The radio access network 120 may communicate with a network core 170 that, in various embodiments, is implemented in a nearby availability zone of a cloud provider network, in an on-premises edge location, at another edge location, or on other network-accessible computing resources. For example, the network core 170 may be implemented using spare capacity of an outpost that implements RAN functionality, or on a separate outpost. In some implementations, the network core may be implemented in a local zone that is proximate to the edge location which runs the RAN. The backhaul network 160 may similarly be partially or fully implemented on a cloud provider network, in various embodiments. The network core 170 provides control plane functionality, as described above, and performs management and control functions for the telecommunications network, such as authenticating subscribers, applying usage policies, managing UE sessions, and other control plane functions. In some embodiments, the network core 170 may support multiple RANs, and may further support RANs from multiple tenants or customers. In other embodiments, the network core 170 may be implemented on dedicated computing resources for a particular wireless network operator, which may be provided on premises or within the cloud provider network.

It will be understood that the radio access network 120, the network core 170, and the example operating environment 100 may include more (or fewer) components than those depicted in FIG. 1. It is not necessary, however, that all of these generally conventional elements be shown in order to provide an enabling disclosure.

Figure 2:
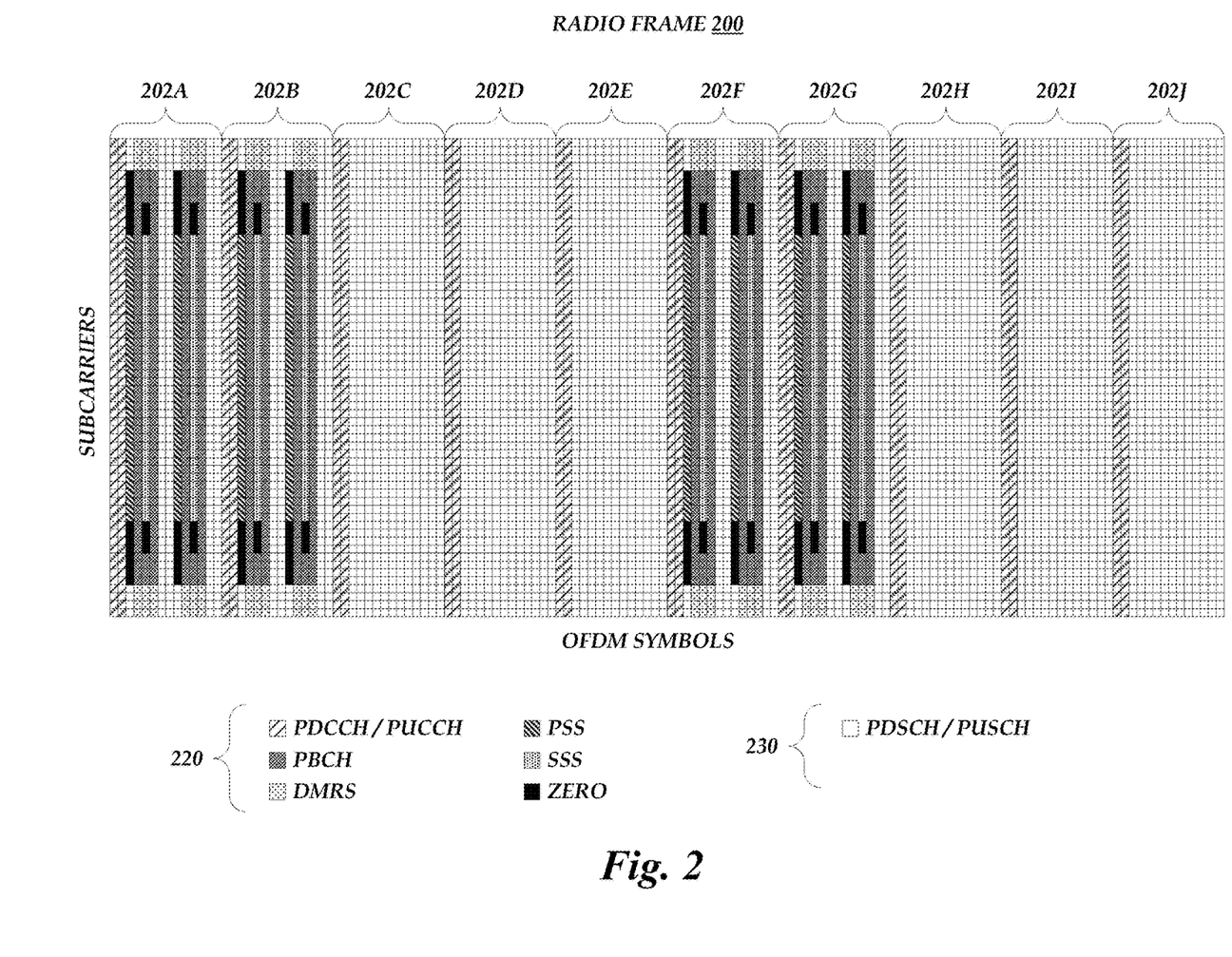
FIG. 2 is a pictorial diagram depicting an example radio frame that may be created and/or transmitted (or, in some embodiments, received and/or converted into data) by components of a radio access network in accordance with aspects of the present disclosure.

FIG. 2 is a pictorial diagram depicting an example radio frame 200 that may be generated and populated by components of a radio access network in accordance with the present disclosure. The example radio frame 200 is generally a data structure that stores information regarding radio signals that will be transmitted (or have been received) by a radio unit, such as the radio unit 122 depicted in FIG. 1. The radio frame 200 represents the signals that will be transmitted or received within a particular 10 millisecond interval, and generally represents these signals as a grid of cells, in which the rows correspond to "subcarriers" (radio frequencies), the columns correspond to points in time within the 10 millisecond interval, and the individual cells represent "resource elements" that are populated with orthogonal frequency division multiplexing ("OFDM") symbols, which in turn are converted by the radio unit 122 into radio waves representing pairs of bits of information (e.g., 00, 01, 10, or 11). Generally described, the radio access network 120 depicted in FIG. 1 may receive data (via the centralized unit 150) for delivery to user devices 102, and components of the radio access network 120 may perform various transformations on the data such as inserting error correction codes, modulating the data and encoding it into OFDM symbols, and determining placements of these symbols within the radio frame 200. Components of the radio access network 120 (e.g., the layer 2 processing module 134) may also implement wireless telecommunications protocols by placing information in the radio frame such as synchronization signals, control channel information (e.g., where within the radio frame a particular mobile device should expect to send or receive data), and other information that allows mobile devices to receive and decode the radio frame.

The radio frame 200 may illustratively be broken into subframes 202A-J, each of which corresponds to a 1 millisecond interval within the 10-millisecond radio frame 200. The subframes 202A-J may contain various signals or channels 220 that implement a particular wireless telecommunications standard, such as the physical download control channel ("PDCCH"), physical upload control channel ("PUCCH"), physical broadcast channel ("PBCH"), primary synchronization signal ("PSS"), secondary synchronization signal ("SSS"), demodulation reference signals ("DMRS"), resource elements that are intentionally unused (depicted as "ZERO" in FIG. 2), and may further contain shared upload and/or download channels 230 that deliver data to/from the user devices 102. It will be understood that, although aspects of the present disclosure refer to channels and signals found in the 5G wireless telecommunications standard, the present disclosure is not limited to any particular standard or protocol and includes standards and protocols other than 5G within its scope.

Figure 3:
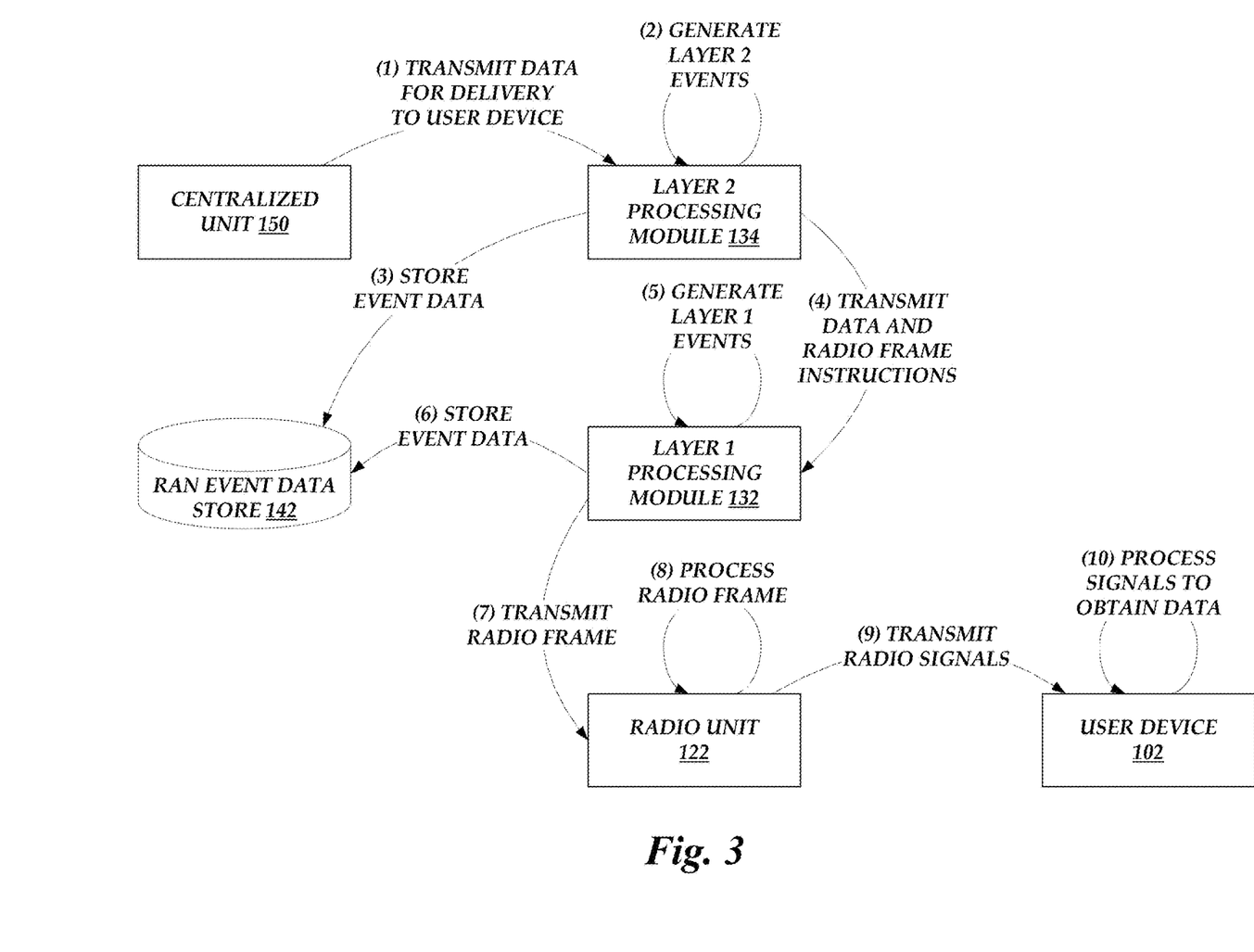
FIG. 3 is a flow diagram depicting example interactions in which a radio access network event tracing system may capture and process events associated with creation and/or transmission of a radio frame in accordance with aspects of the present disclosure.

FIG. 3 is a flow diagram depicting example interactions by which a RAN event tracing system may capture events that occur during the generation of radio frames. In some embodiments, events that occur during the receipt of radio frames, and their subsequent translation into data, may similarly be captured. The example interactions begin at (1), where a centralized unit 150 may transmit data to a layer 2 processing module 134 for delivery to a user device 102.

At (2), the layer 2 processing module 134 may perform various actions relating to the data received at (1) that may be captured as separate events by the RAN event tracing system. Actions performed by the layer 2 processing module 134 may include, for example, organizing data into a transport block, prioritizing, scheduling, mapping between logical channels and transport channels, error correction, padding, duplicate detection, assigning channels or signals to particular resource elements of a radio frame (e.g., in order to ensure compliance with wireless telecommunications protocols or to deliver particular data to a user device 102), and the like. At (3), the layer 2 processing module 134 may store event data regarding the events performed at (2) in a RAN event data store 142. In some embodiments, the RAN event tracing system may "pull" event data from the layer 2 processing module 134 (e.g., by retrieving the event data from log files) rather than the layer 2 processing module 134 "pushing" the event data to the RAN event data store 142. In other embodiments, the RAN event tracing system may actively monitor and log the activities of the layer 2 processing module 134 rather than relying on the layer 2 processing module 134 to self-report its activities.

At (4), the layer 2 processing module 134 may transmit processed data and instructions for generating a radio frame to the layer 1 processing module 132, which at (5) may perform various actions (which, similarly to the layer 1 processing module 132, may be captured as events) to generate and populate the radio frame. Illustratively, actions performed by the layer 2 processing module 132 may include segmenting the transport block, inserting error correction codes, encoding (e.g., polar or LDPC), rate matching, concatenating, scrambling, modulating, layer mapping, antenna port mapping, and other such actions, each of which may be captured as an event. At (6), the layer 1 processing module 132 may store event data regarding the events performed at (5) in the RAN event data store 142.

At (7), the layer 1 processing module 132 may transmit the radio frame to a radio unit 122, which at (8) may process the radio frame (e.g., by performing Fourier transformations) into the actual radio signals that are transmitted to the user device(s) 102. At (9), the radio unit 122 may transmit these radio signals over the air, and at (10) the radio signals may be received by the user device(s) 102 and processed in order to obtain the data that was originally transmitted at (1). In some embodiments, the radio unit 122 may capture events during the interaction at (8) and store these events in the RAN event data store 142, or may store information regarding the interaction at (9), such as the date and time when the interaction occurred. Similarly, in some embodiments, the centralized unit 150 may capture events relating to the transmission of the data at (1), and may store these events in the RAN event data store 142 for later retrieval and analysis by a RAN event tracing system.

It will be understood that FIG. 3 is provided for purposes of example, and that many variations on the depicted interactions are within the scope of the present disclosure. For example, the interactions at (2), (3), (4), (5), and (6) may occur at least partially in parallel. As a further example, the functionality of the layer 1 processing module 132 and/or the layer 2 processing module 134 may be divided across multiple computing devices, each of which may generate and store event data separately. FIG. 3 is thus understood to be illustrative and not limiting.

Figure 4A:
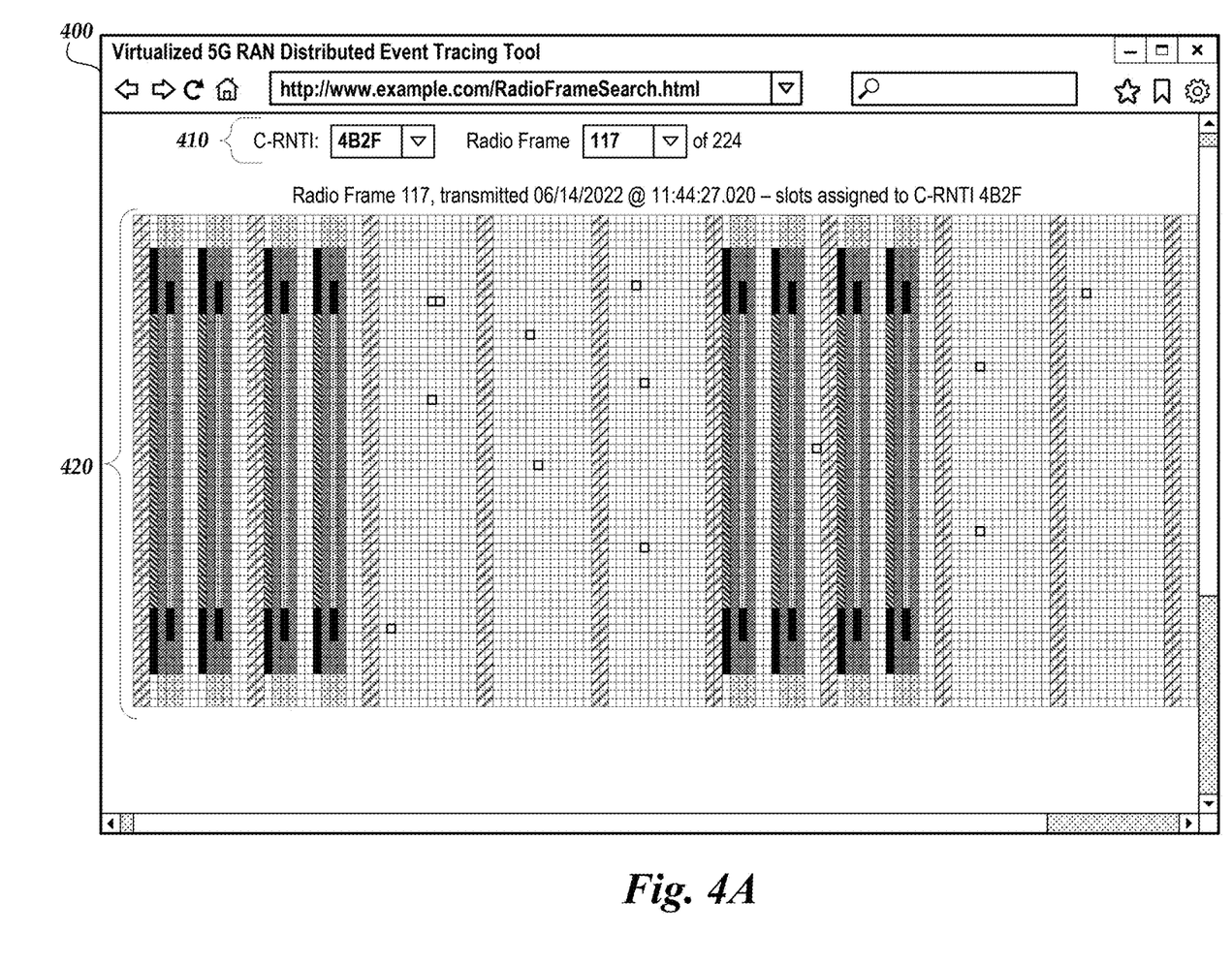
FIGS. 4A and 4B are pictorial diagrams depicting example user interfaces, including representations of radio frames and associated events, that a radio access network event tracing system may generate and/or display in accordance with aspects of the present disclosure.

FIG. 4A is a pictorial diagram of an example user interface 400 for tracing RAN events in accordance with aspects of the present disclosure. The user interface 400 may be displayed, for example, by the RAN event tracing system 140 depicted in FIG. 1. In the illustrated embodiment, the user interface 400 includes controls 410 for selecting or inputting an identifier, such as an RNTI, and for selecting one of the radio frames associated with that identifier for display and analysis. In some embodiments, the user interface 400 may include, for example, controls for selecting or inputting a timeframe, mobile device identifier, or other controls that may allow a user to input a search query and then allow a RAN event tracing system to identify events and/or radio frames of interest. For example, the user interface 400 may include controls that allow a user to query for RNTIs associated with a mobile device and/or to select an RNTI from a list of RNTIs associated with the mobile device.

The user interface 400 may further include a representation 420 of a radio frame. The representation 420 may, in some embodiments, identify particular resource elements within the radio frame as being associated with the selected identifier. For example, particular resource elements may be highlighted, shaded, outlined, or otherwise marked to show that they are associated with the identifier. In some embodiments, the marked (and, in further embodiments, unmarked) resource elements may be selectable user interface elements whose selection causes display of further information, as described in more detail below with reference to FIG. 4B. In other embodiments, resource elements associated with the selected identifier may be presented as a list, as nodes in a hierarchical data structure, or in other formats.

Figure 4B:
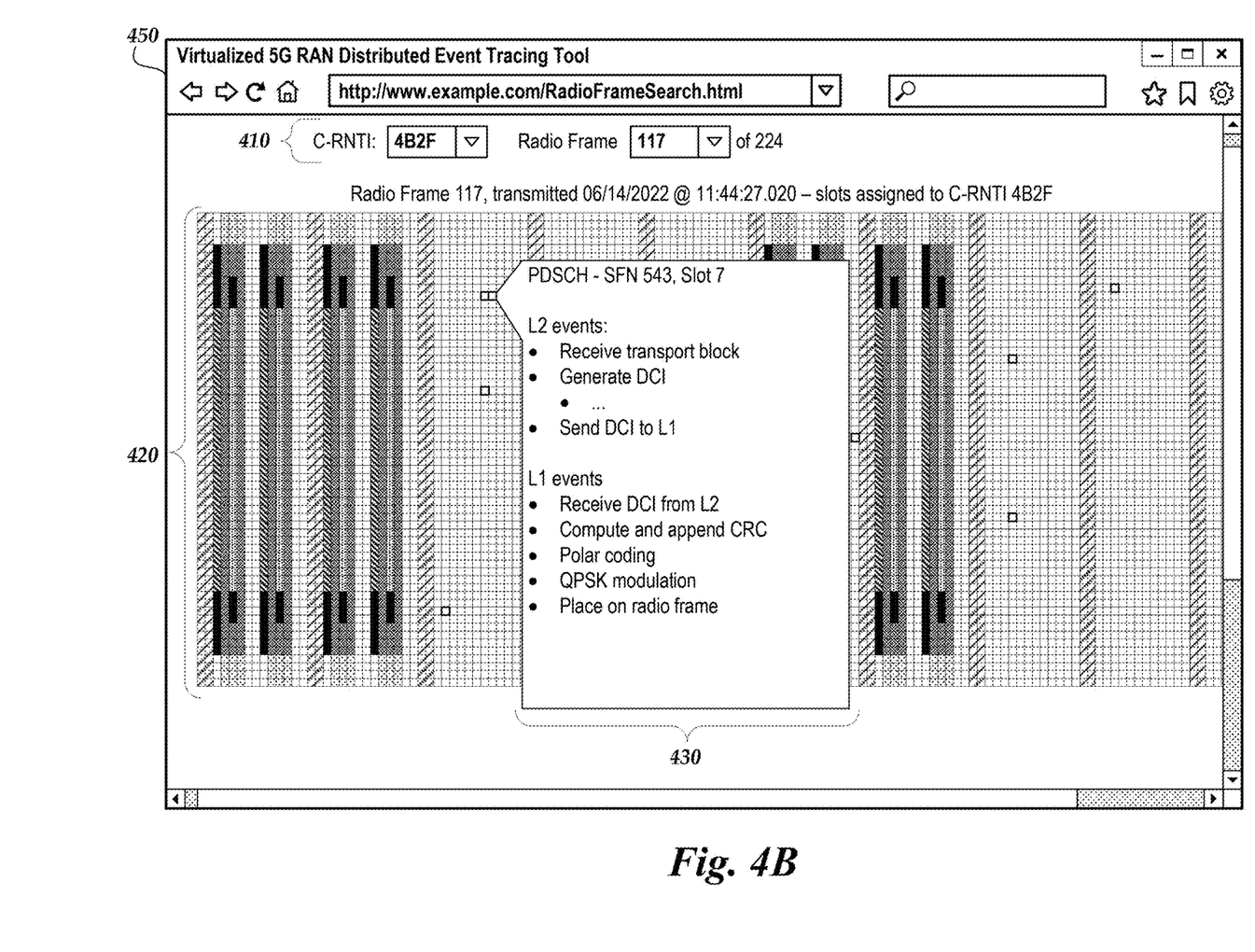

FIG. 4B is a pictorial diagram of an updated user interface 450 that displays additional information in response to user input, such as the selection of a particular resource element.

As depicted, the updated user interface 450 includes the elements of the user interface 400, whose descriptions are not repeated in the interests of brevity, as well as an event information display 430 that displays information regarding the set of events that led to the selected resource element being placed in the radio frame. In some embodiments, individual events in the event information display 430 may themselves be selectable, and their selection may cause display of further information regarding the selected event or information regarding sub-events or child events. For example, the event information display 430 may include a "generate DCI" event, and selecting that event may display child events relating to how the DCI was generated (e.g., how the values that comprise the DCI were determined). In some embodiments, the event information display 430 may display the events in a hierarchical list or other hierarchical data structure, allowing the user to expand and collapse nodes of the structure to display further information regarding particular events or sets of events.

In some embodiments, the event information display 430 may be displayed in a separate window, tab, or in another portion of the user interface 450 rather than being overlaid on the representation 420 of the radio frame as depicted in FIG. 4B. In other embodiments, the user interface 450 may include search functions that allow searching for particular events, and may thus allow the user to identify and analyze, e.g., all quadrature phase shift keying ("QPSK") modulation events that were associated with both the identifier and the radio frame, all QPSK modulation events that occurred within a particular time period, and so forth.

It will be understood that FIGS. 4A and 4B are provided for purposes of example, and that many variations on the depicted user interfaces are within the scope of the present disclosure. For example, the representation 420 of the radio frame may be a list of slots that were assigned or associated with a particular identifier. As a further example, the user interface 400 or 450 may enable inspection of the content of the radio frame (e.g., the bits or signals that were transmitted or received) instead of or in addition to the assignments and associated events. FIGS. 4A and 4B are thus understood to be illustrative and not limiting.

Figure 5:
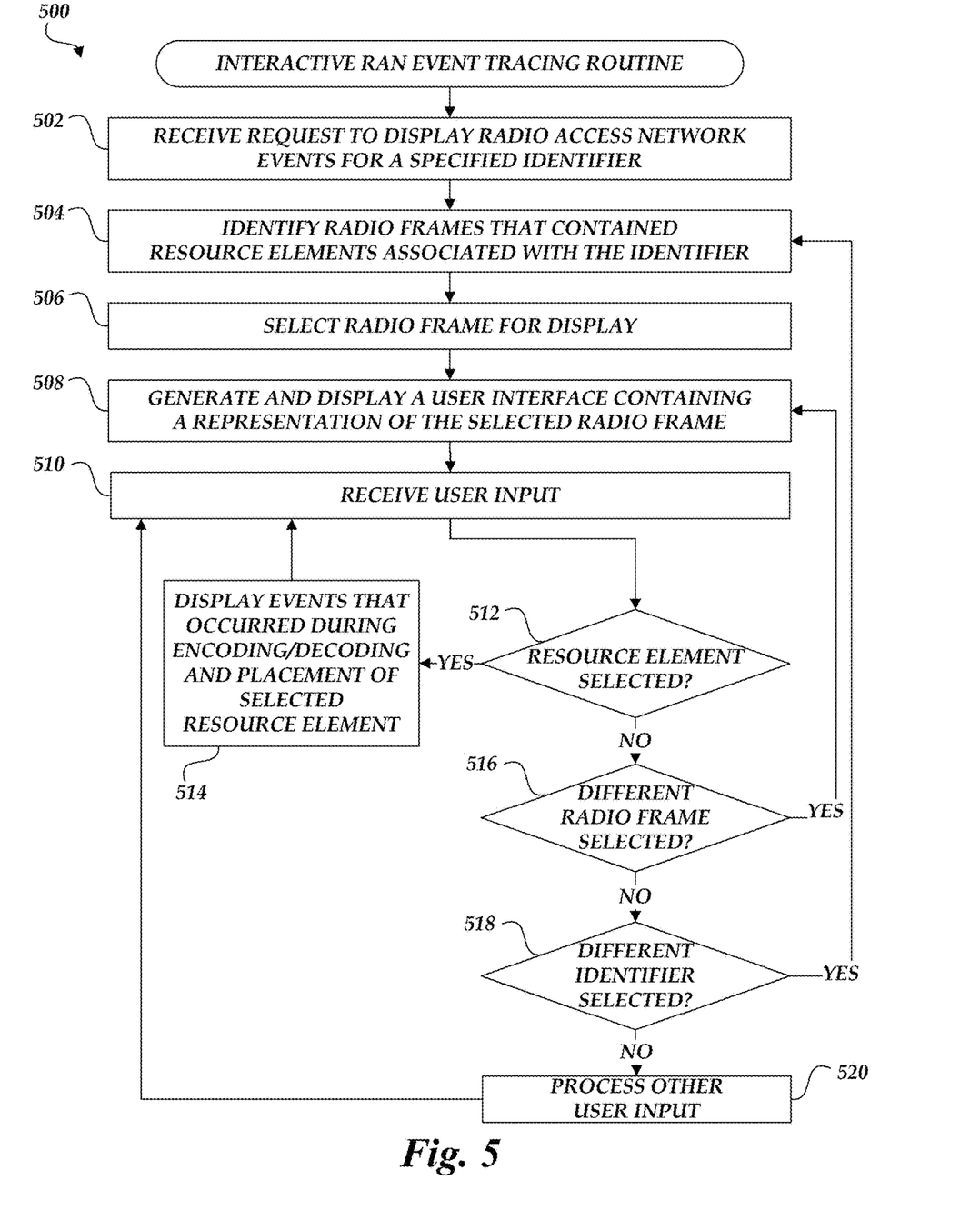
FIG. 5 is a flow chart depicting an example routine for displaying radio access network events in accordance with aspects of the present disclosure.

FIG. 5 is a flow chart depicting an example routine 500 for implementing interactive RAN event tracing in accordance with aspects of the present disclosure. The example routine 500 may be carried out, for example, by the RAN event tracing system 140 depicted in FIG. 1. In the illustrated embodiment, the routine 500 begins at block 502, where a request may be received to display RAN events associated with a specified identifier, such as a radio network temporary identifier ("RNTI") that is associated with a particular mobile device during a particular usage session. In some embodiments, a request may be received to display RAN events associated with a specified mobile device and/or time window, and one or more RNTIs may be obtained (e.g., from a table or other data store) based on these request parameters. In other embodiments, a request may be received to display RAN events that occurred during a specified time window, at a specified location, or based on other criteria aside from or in addition to an RNTI or other mobile device identifier.

At block 504, previously transmitted or received radio frames that contained resource elements associated with the specified identifier may be identified. In some embodiments, radio frames may be identified by identifying events that placed resource elements associated with the RNTI on a radio frame. In other embodiments, the RNTIs associated with resource elements in the radio frame may be captured and stored when the radio frame is generated (or, in some embodiments, when the resource elements are placed), and radio frames may be identified by searching the data. At block 506, a radio frame may be selected for display. Initially, in some embodiments, the radio frame that is chronologically earliest may be selected.

At block 508, a user interface may be generated and displayed that contains a representation of the selected radio frame. Illustratively, the user interface that is generated and displayed may be the example interface 400 depicted in FIG. 4A. As discussed above, the representation of the radio frame may include selectable user interface elements that correspond to subframes, resource elements, frequencies, symbols, or other components of the radio frame. In some embodiments, resource elements that are associated with the specified identifier may be highlighted, and only these resource elements may be selectable. The user interface may further include elements for selecting different radio frames, elements for selecting different RNTIs or other mobile device identifiers, and so forth.

At block 510, user input may be received. Thereafter, at decision block 512, a determination may be made as to whether a resource element has been selected from among the selectable resource elements displayed in the user interface. If so, then at block 514 events that led to the placement of the selected resource element in the radio frame (or, in some embodiments, events that followed after receiving a radio frame with that resource element) may be displayed. Illustratively, the events may be displayed in an updated user interface or in a user interface element that is superimposed on the radio frame, as depicted in FIG. 4B. In some embodiments, the events may be displayed in a hierarchical data structure (e.g., a data structure having a parent node for layer 2 events, with child nodes for individual events such as generating downlink control information ("DCI") and grandchild notes for determining the values of particular fields or items in the DCI), which may allow the user to expand individual list entries to show further detail regarding a particular event or its child events. In some embodiments, the events may be displayed in a "stack trace" format that indicates how the selected resource element came to be placed at this location on the radio frame, how the selected resource element was generated, the original user data (e.g., a portion of a transport block) from which this resource element was generated, and so forth. The routine 500 then returns to block 510 and awaits further user input.

If the determination at decision block 512 is that the user input was not selection of a resource element, then at decision block 516 a determination may be made as to whether the user has selected a different radio frame than the one currently displayed. Illustratively, the user may select another radio frame that also contains resource elements associated with the identifier of interest, and may compare events associated with different radio frames to identify differences in processing. If so, then the routine 500 branches to block 508, generates and displays a user interface containing a representation of the newly selected radio frame, and then returns to block 510 and awaits further user input. If the determination at decision block 516 is that the user has not selected a different radio frame, then the routine 500 continues to decision block 518, where a determination may be made as to whether the user has selected a different identifier. If so, then the routine 500 branches to block 504, identifies radio frames associated with the newly selected identifier and iterates through blocks 506, 508, and 510. If the user has not selected a different identifier, then the routine 500 falls through to block 520, where other user input may be processed, and then returns to block 510 to await further user input. In some embodiments, the routine 500 may include a decision block at which a determination is made as to whether the user has exited or closed the user interface, in which case the routine 500 may terminate.

It will be understood that FIG. 5 is provided for purposes of example, and that many variations on the depicted routine 500 are within the scope of the present disclosure. For example, the decision blocks 512, 516, and 518 may be carried out in any order or in parallel. As a further example, a request to display a particular radio frame may be received at block 502, and blocks 504 and 506 may thus be omitted. FIG. 5 is thus understood to be illustrative and not limiting.

Figure 6:
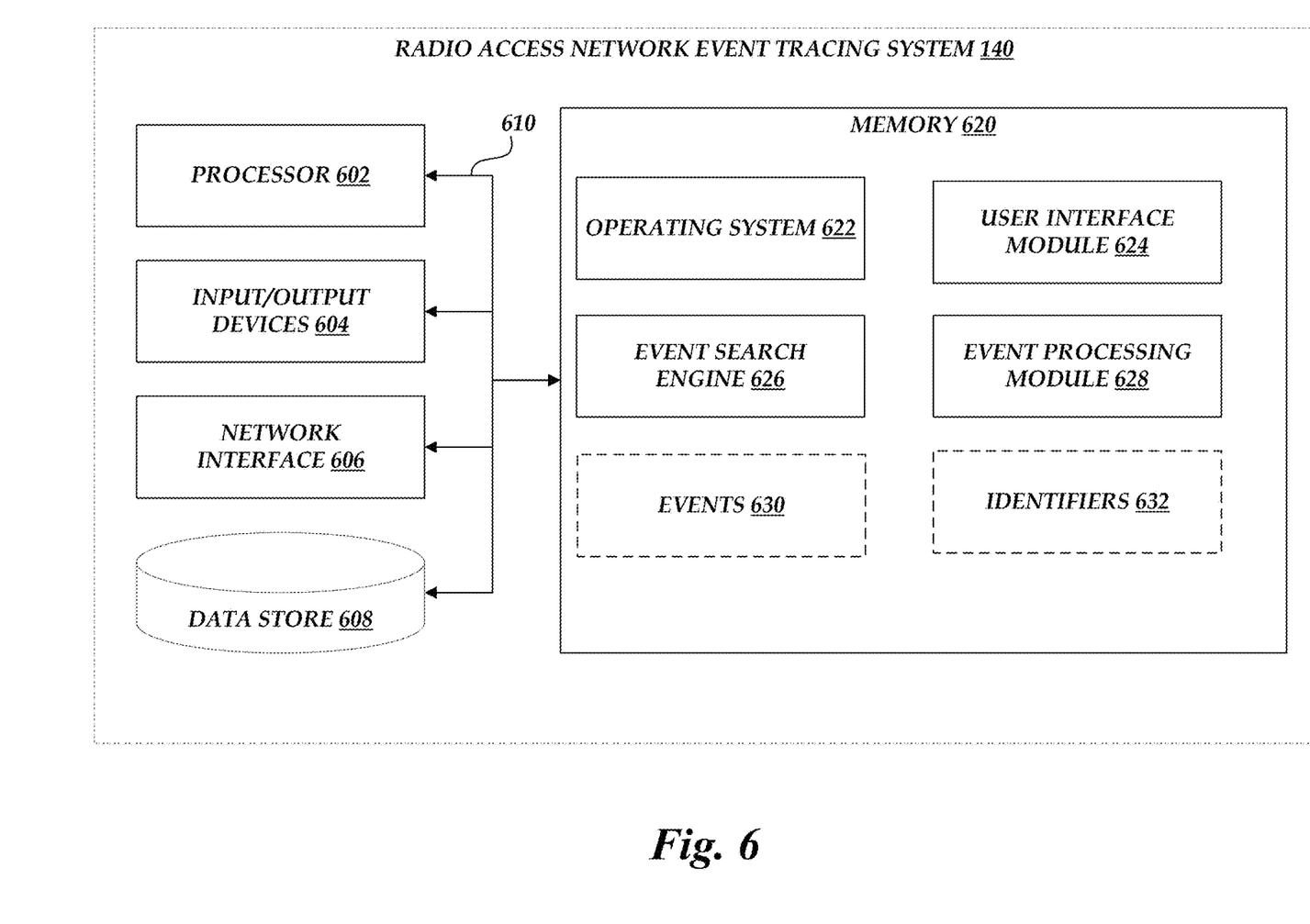
FIG. 6 is a block diagram depicting a general architecture of a computing device that is configured to implement a radio access network event tracing system in accordance with aspects of the present disclosure.

FIG. 6 depicts a general architecture of a computing system (referenced as RAN event tracing system 140) that traces and facilitates analysis of RAN events in accordance with aspects of the present disclosure. The general architecture of the RAN event tracing system 140 depicted in FIG. 6 includes an arrangement of computer hardware and software modules that may be used to implement aspects of the present disclosure. The hardware modules may be implemented with physical electronic devices, as discussed in greater detail below. The RAN event tracing system 140 may include many more (or fewer) elements than those shown in FIG. 6. It is not necessary, however, that all of these generally conventional elements be shown in order to provide an enabling disclosure. Additionally, the general architecture illustrated in FIG. 6 may be used to implement one or more of the other components illustrated in FIG. 1.

As illustrated, the RAN event tracing system 140 includes a processor 602, input/output device interfaces 604, a network interface 606, a data store 608, and a memory 620, all of which may communicate with one another by way of a communication bus 610. The network interface 606 may provide connectivity to one or more networks or computing systems, such as other components of the operating environment 100 depicted in FIG. 1. The processor 602 may thus receive information and instructions from other computing systems or services. The processor 602 may also provide output information for an optional display (not shown) via the input/output device interfaces 604. The input/output device interfaces 604 may also accept input from an optional input device (not shown).

The memory 620 may contain computer program instructions (grouped as modules in some embodiments) that the processor 602 executes in order to implement one or more aspects of the present disclosure. The memory 620 generally includes random access memory (RAM), read only memory (ROM) and/or other persistent, auxiliary or non-transitory computer readable media. The memory 620 may store an operating system 622 that provides computer program instructions for use by the processor 602 in the general administration and operation of the RAN event tracing system 140. The memory 620 may further include computer program instructions and other information for implementing aspects of the present disclosure. For example, in one embodiment, the memory 620 includes a user interface module 624 that generates user interfaces (and/or instructions therefor) such as those depicted in FIGS. 4A and 4B, and may further generate interfaces for interacting with other computing devices, e.g., via an API, CLI, and/or Web interface.

In addition to and/or in combination with the user interface module 624, the memory 620 may include an event search engine 626 that may be executed by the processor 602. In some embodiments, the event search engine 626 implements various aspects of the present disclosure, such as carrying out the interactions and routines described herein for identifying events associated with a particular identifier. The memory 620 may further include an event processing module 628, which in some embodiments implements aspects of the present disclosure such as associating events with a particular identifier. The memory 620 may yet further include events 630, which, as described in more detail above, may be obtained from components of a radio access network via the network interface 606 or from the data store 608. The memory 620 may yet further include identifiers 632, which as described above may be associated with various events 630. In some embodiments, the memory 620 may further include, e.g., event hierarchies or other data.

In some embodiments, the RAN event tracing system 140 may further include components other than those illustrated in FIG. 6. For example, the memory 620 may further include user queries, generated user interfaces, information regarding user input, and the like. FIG. 6 is thus understood to be illustrative but not limiting.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can." "could." "might." or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. A system comprising:
   a data store configured to store computer-executable instructions; and
   a processor in communication with the data store, wherein the computer-executable instructions, when executed by the processor, configure the processor to perform operations including:
   receiving a radio frame or data associated with generation of the radio frame, the radio frame comprising a plurality of resource elements;
   receiving a request for a radio access network ("RAN") event trace, the request including a radio network temporary identifier ("RNTI");
   obtaining a plurality of events corresponding to the RNTI, the plurality of events including a set of layer 1 events generated by a layer 1 processing module and a set of layer 2 events generated by a layer 2 processing module, wherein the set of layer 1 events includes at least a first event in which a modulated data symbol associated with the RNTI is mapped to a first resource element of the plurality of resource elements, and wherein the set of layer 2 events includes at least a second event in which information regarding the radio frame, to be used by the layer 1 processing module for populating the first resource element, is generated;
   generating a user interface for display, the user interface including a representation of the radio frame;
   causing display of the user interface;
   receiving, via the user interface, input indicating selection of the first resource element; and
   in response to the selection of the first resource element, causing display of information regarding one or more events from the plurality of events, wherein the information comprises the set of layer 1 events and the set of layer 2 events that are associated with populating the first resource element.

2. The system of claim 1, wherein the set of layer 2 events includes at least one event in which data is received from a centralized unit.

3. The system of claim 1, wherein the plurality of events includes a first event in which the modulated data symbol is generated using quadrature phase shift keying ("QPSK") modulation.

4. The system of claim 1, wherein the RNTI is associated with a mobile device.

5. The system of claim 1, wherein the data store is configured to store further computer-executable instructions that, when executed by the processor, configure the processor to perform further operations including:
   receiving, via a search query interface, a query for RNTIs associated with a first mobile device;
   in response to the query, displaying a search result interface, the search result interface including a plurality of RNTIs associated with the first mobile device; and
   receiving, via the search result interface, the request for the RAN event trace, wherein the request for the RAN event trace comprises input indicating selection of the RNTI.

6. A computer-implemented method comprising:
   receiving a radio frame or data associated with generation of the radio frame, the radio frame comprising a plurality of resource elements;
   receiving a request for a radio access network ("RAN") event trace, the request including a radio network temporary identifier ("RNTI");
   obtaining a plurality of events associated with the RNTI, the plurality of events including (i) a first event in which data associated with the RNTI is mapped to a first resource element of the plurality of resource elements and (ii) a second event in which information regarding the radio frame to be used for populating the first resource element is generated;
   causing display of a representation of the radio frame including the first resource element; and
   in response to user input indicating selection of the first resource element, causing display of information regarding one or more events from the plurality of events, wherein the information comprises the first event and the second event that are associated with populating the first resource element.

7. The computer-implemented method of claim 6, wherein the first resource element is allocated to a physical downlink shared channel, physical uplink shared channel, physical downlink control channel, or physical uplink control channel.

8. The computer-implemented method of claim 6, wherein the data associated with the RNTI comprises at least a portion of a transport block.

9. The computer-implemented method of claim 6, wherein the representation of the radio frame identifies a subset of the plurality of resource elements as being associated with the RNTI.

10. The computer-implemented method of claim 6, wherein the plurality of events include one or more of encoding events, decoding events, modulation events, demodulation events, rate matching events, mapping events, synchronization events, beamforming events, multiplexing events, demultiplexing events, error detection events, error correction events, prioritization events, segmentation events, or scheduling events.

11. The computer-implemented method of claim 6, wherein a first portion of the plurality of events are generated by a first component of a distributed unit, and wherein the first component comprises a processor that implements accelerated layer 1 functionality.

12. The computer-implemented method of claim 6, wherein the representation of the radio frame identifies one or more resource elements as being assigned to a physical broadcast channel, demodulation reference signal, primary synchronization signal, secondary synchronization signal, reference signal, or as being unused.

13. The computer-implemented method of claim 6, wherein the representation of the radio frame includes representations of individual subframes of a plurality of radio subframes.

14. The computer-implemented method of claim 6, wherein causing display of information regarding one or more events from the plurality of events comprises causing display of a hierarchical list.

15. The computer-implemented method of claim 14 further comprising:

receiving user input indicating a selection of a first event from the hierarchical list; and
causing display of further information regarding the first event.

16. The computer-implemented method of claim 6, wherein the plurality of events associated with the RNTI includes one or more of:
   events that occurred between receipt of data from a centralized unit and transmission of radio signals generated based at least in part on the data, or
   events that occurred between receipt of radio signals and transmission of data derived from the radio signals to a centralized unit.

17. A computer-implemented method comprising:
   receiving a radio frame or data associated with generation of the radio frame, the radio frame comprising a plurality of resource blocks;
   obtaining a plurality of events associated with a radio network temporary identifier ("RNTI"), the plurality of events including (i) a first event in which data associated with the RNTI is mapped to a first resource element of the radio frame comprising the plurality of resource blocks and (ii) a second event in which information regarding the radio frame to be used for populating the first resource element is generated;
   causing display of a user interface, the user interface including a representation of the radio frame; and
   in response to user input indicating selection of the first resource element, causing display of information regarding one or more events from the plurality of events, wherein the information comprises the first event and the second event that are associated with populating the first resource element.

18. The computer-implemented method of claim 17, wherein causing display of the user interface including the representation of the radio frame is in response to a query for information regarding the radio frame.

19. The computer-implemented method of claim 17, wherein causing display of the user interface including the representation of the radio frame is in response to a query for events associated with the RNTI.

20. The computer-implemented method of claim 17, wherein the representation of the radio frame comprises a grid of resource blocks.

\* \* \* \* \*